US010780356B2

(12) United States Patent
Jeon

(10) Patent No.: US 10,780,356 B2
(45) Date of Patent: Sep. 22, 2020

(54) MUSIC GAME APPARATUS AND METHOD, AND COMPUTER-READABLE RECORDING MEDIUM RECORDING PROGRAM THEREFOR

(71) Applicants: NEOWIZ CORPORATION, Seongnam-si, Gyeonggi-do (KR); 12MOMENTS CO., LTD, Seoul (KR)

(72) Inventor: Young Wook Jeon, Bucheon-si (KR)

(73) Assignees: NEOWIZ CORPORATION, Seongnam-si (KR); 12MOMENTS CO., LTD, Seoul (KR)

( * ) Notice: Subject to any disclaimer, the term of this patent is extended or adjusted under 35 U.S.C. 154(b) by 51 days.

(21) Appl. No.: 16/092,629

(22) PCT Filed: Feb. 16, 2017

(86) PCT No.: PCT/KR2017/001704
§ 371 (c)(1),
(2) Date: Oct. 10, 2018

(87) PCT Pub. No.: WO2017/179810
PCT Pub. Date: Oct. 19, 2017

(65) Prior Publication Data
US 2019/0118096 A1    Apr. 25, 2019

(30) Foreign Application Priority Data

Apr. 11, 2016 (KR) .................. 10-2016-0044333
Feb. 14, 2017 (KR) .................. 10-2017-0020077

(51) Int. Cl.
*A63F 9/24* (2006.01)
*A63F 13/814* (2014.01)
(Continued)

(52) U.S. Cl.
CPC ........ *A63F 13/814* (2014.09); *A63F 13/2145* (2014.09); *A63F 13/5375* (2014.09);
(Continued)

(58) Field of Classification Search
CPC ........ G06F 3/167; G10H 1/0008; G10H 1/00; G10H 1/0041; A63F 13/814; A63F 13/214; A63F 13/54
See application file for complete search history.

(56) References Cited

U.S. PATENT DOCUMENTS 6,390,923 B1 *  5/2002  Yoshitomi ............... A63F 13/00
                                                            463/43
6,482,087 B1 * 11/2002  Egozy ..................... A63F 13/12
                                                            463/7
(Continued)

FOREIGN PATENT DOCUMENTS

JP      200911663 A     1/2009
JP      201036038 A     2/2010
(Continued)

OTHER PUBLICATIONS

International Search Report (in English and Korean) and Written Opinion (in Korean) issued in PCT/KR2017/001704, dated Jun. 26, 2017; ISA/KR.

*Primary Examiner* — Steve Rowland
(74) *Attorney, Agent, or Firm* — Harness, Dickey & Pierce, P.L.C.

(57) ABSTRACT

The present invention relates to a music game apparatus and a recording medium therefor and, more specifically, provides an operation guide note consisting of a start note, a cadence note, and a path indicated line connecting the same, and determines the success of the operation of a corresponding note only by the time interval and direction of moving the operation along the path indicated line, thereby enabling (Continued)

the playing of a game in accordance with a tempo of a music, and improving the interest for the game.

20 Claims, 6 Drawing Sheets

(51) Int. Cl.
| | |
|---|---|
| *A63F 13/2145* | (2014.01) |
| *G06F 3/16* | (2006.01) |
| *G10H 1/00* | (2006.01) |
| *G10H 1/40* | (2006.01) |
| *A63F 13/54* | (2014.01) |
| *A63F 13/5375* | (2014.01) |

(52) U.S. Cl.
CPC ............. *A63F 13/54* (2014.09); *G06F 3/167* (2013.01); *G10H 1/00* (2013.01); *G10H 1/0008* (2013.01); *G10H 1/40* (2013.01); *G10H 2210/091* (2013.01); *G10H 2220/005* (2013.01); *G10H 2220/135* (2013.01)

(56) References Cited

U.S. PATENT DOCUMENTS

| | | | |
|---|---|---|---|
| 7,212,213 B2* | 5/2007 | Steinberg | ............. G10H 1/0008 345/440 |
| 8,167,719 B2 | 5/2012 | Cha | |
| 8,728,822 B2 | 5/2014 | Ryu | |
| 2005/0255914 A1* | 11/2005 | McHale | .................. A63F 13/10 463/31 |
| 2006/0009979 A1* | 1/2006 | McHale | .................. A63F 13/10 704/270 |
| 2008/0188305 A1* | 8/2008 | Yamazaki | ............... A63F 13/06 463/36 |
| 2008/0200224 A1* | 8/2008 | Parks | ..................... G10H 1/368 463/7 |
| 2009/0104956 A1* | 4/2009 | Kay | ........................ A63F 13/10 463/7 |
| 2010/0035685 A1* | 2/2010 | Cha | ......................... A63F 13/10 463/35 |
| 2011/0086704 A1* | 4/2011 | Davis | ..................... A63F 13/46 463/31 |
| 2011/0294577 A1 | 12/2011 | Ryu | |
| 2014/0051512 A1* | 2/2014 | Rasanen | ............... A63F 13/005 463/31 |
| 2016/0175718 A1* | 6/2016 | Yoo | ....................... A63F 13/814 463/35 |
| 2018/0078857 A1 | 3/2018 | Kim | |

FOREIGN PATENT DOCUMENTS

| | | |
|---|---|---|
| JP | 2012525953 A | 10/2012 |
| JP | 2016-041141 A | 3/2016 |
| KR | 10-0867401 B1 | 11/2008 |
| KR | 2010-0135064 A | 12/2010 |
| KR | 20100135064 A * | 12/2010 |
| KR | 10-1150614 B1 | 5/2012 |
| KR | 2012-0096360 A | 8/2012 |
| KR | 10-1606074 B1 | 4/2016 |
| WO | WO-2012036348 A1 | 3/2012 |

* cited by examiner

MUSIC GAME APPARATUS AND METHOD, AND COMPUTER-READABLE RECORDING MEDIUM RECORDING PROGRAM THEREFOR

CROSS-REFERENCE TO RELATED APPLICATIONS

This application is a U.S. National Phase Application under 35 U.S.C. 371 of International Application No. PCT/KR2017/001704 filed on Feb. 16, 2017 and published in Korean as WO 2017/179810 A2 on Oct. 19, 2017. This patent application claims priority under 35 U.S.C. § 119(a) from Korean Patent Application No. 10-2016-0044333, filed on Apr. 11, 2016, and Korean Patent Application No. 10-2017-0020077, filed Feb. 14, 2017. The disclosures of the above applications are incorporated herein by reference. Furthermore, this patent application claims priorities in countries other than the U.S., for the same reason based on the Korean Patent Applications, the entire contents of which are incorporated herein by reference.

TECHNICAL FIELD

The present disclosure relates to a music game apparatus and method, and a computer-readable recording medium recording a program therefor and, more particularly, to a music game apparatus and method capable of freely performing an input operation along a connecting line in a path note composed of two fixed notes and a connecting line connecting the two fixed notes, and a computer-readable recording medium recording a program therefor.

BACKGROUND ART

In recent years, as the hardware performance of mobile devices has been rapidly developed, a variety of mobile-exclusive games have been released in addition to desktop computer-based games.

Among them, a music game or a rhythm game, which is operated in a method of generating various directing effects by manipulating an input device while a user is listening to music, has gained popularity.

Such a music game or a rhythm game is operated in such a manner that the user inputs an input format suitable for the input device in accordance with a music rhythm reproduced in real-time so that various corresponding musical or visual effects such as a sound effect or reproduction of visual movements combined with the sound effect are generated. This allows the user to play the game while actually listening to the music, or to have a feeling of playing the corresponding music.

Therefore, in a music game, it is very important how a user inputs an input signal to an input unit. This is because an input operation method input by the user becomes an action of a gamer in the music game, and the interest in the music game is generated according to the input operation method.

In the existing music games, a key input guidance marker for guiding a key input of a user in conjunction with music is output to a display unit while the music is output.

Such a key input guidance marker can be expressed as a "note" and may have various forms.

The note is used to guide key input operation timing and a key input position, which are associated with music generated on a screen of a game apparatus and moved or output while being changed in shape.

As one example associated with the note and the operation of the note, a determination area is displayed on a part of a game screen, a circular note is generated and moved to the determination area, and when the note reaches the determination area, the key input operation is performed by touching the corresponding note. Such a note can be expressed as a circular note, a tab note, or the like.

The game apparatus may determine the success or failure of the key input operation for each note, may compensate for the success, and may output a certain operation success indication or success sound effect upon successful key input operation.

There is another type of note called a hold note, which guides a user to continuously hold a key input or a touch input in the same position for a certain period of time.

There are also a drag type note and a path type note, each being composed of one or more circular notes and a connecting line connecting two circular notes.

In such a drag note or path note, when a drag operation of touching the circular note at specific timing and moving a touched position along the connecting line while holding the touch, it is determined that the corresponding operation is successful.

Among these various types of notes, the drag note or the path note has an operation method in which a user has to input a key along the connecting line (path indicated line) at a constant speed (uniform speed) at a given time in order to receive an input success determination. This is to determine the success or failure of the key input by the user in the music game, to classify the level of the key according to the accuracy of the input key, and to calculate a final score.

That is, in the case of the path note, a user has to touch (key input) an input start note (circular note) and then move (drag) the touch input along the connecting line at a constant speed, and to this end, a marker for indicating the moving speed of the touch input may be displayed on the connecting line.

However, since music output during the game is consisting of different tempos, the movement speed of the operation along a path line must be set differently according to the tempo of the music in the existing path note, so that there is a disadvantage that the note configuration is complicated.

On the contrary, when the movement speed of the operation of the connecting line is set to be constant without being adjusted to match the music tempo to simplify the note configuration, synchronization with the output music is not performed so that the interest in the game may be reduced.

In addition, due to the limitation of a mobile screen size, a mobile device-based music game has a fundamental difficulty in introducing complicated and various types of path notes.

This problem is becoming more problematic due to a touch method, which is a mobile device-based input method.

A user touches the limited mobile screen to input a key thereon, but this operation itself hides the game screen so that it cannot smoothly perform a music game. For this reason, the path note in the mobile device-based music game is formed by a simple straight line, and a user is forced to follow the path indicated line at a uniform speed.

Therefore, a new method for solving such a problem is required.

DETAILED DESCRIPTION OF THE INVENTION

Technical Problem

Therefore, the present disclosure has been made in view of the above-mentioned problems, and an aspect of the present disclosure is to provide a game apparatus and method which may freely perform an input operation along a line consisting of straight and curved lines in a music game to deliver a feeling of playing actual music to a user, and a recording medium therefor.

Another aspect of the present disclosure is to provide a music game apparatus and the like which may provide an operation guidance note composed of a start note, a cadence note, and a path indicated line connecting the start note and the cadence note and may determine the success or failure of the operation of the corresponding note only by a time interval and direction of moving the operation along the path indicated line, so that it is possible to play the corresponding game according to the tempo of music.

Technical Solution

In accordance with an aspect of the present disclosure, there is provided a music game apparatus including: a game screen providing unit configured to provide an operation guidance note including a start note, a cadence note, and a path indicated line connecting the start note and the cadence note on a game screen; an input unit configured to receive an operation of a user associated with the operation guidance note; a determination unit configured to determine whether the operation of the user starts at the start note and ends at the cadence note within a predetermined time to determine whether an operation on a corresponding operation guidance marker is successful; and a voice controller configured to reproduce sound source data including an effect sound source according to whether an operation on the operation guidance note is successful and a music sound source constituting music according to progress of a game.

Here, the operation of the user input to the input unit may be a touch input on the game screen, and the determination unit may determine that the operation on the operation guidance marker is successful when the touch input is started at the start note and moves to the cadence note along the path indicated line in a state in which the touch input is held for the predetermined time.

The start note may include a start note outer wall and a start note operation guidance marker that is generated inside the start note outer wall and varies in size up to a first size, and the touch input may be started by touching the start note when the start note operation guidance marker reaches the first size. The cadence note may include a cadence note outer wall and a cadence note operation guidance marker that is generated inside the cadence note outer wall and varies in size up to a second size, and the cadence note operation guidance marker may be generated at timing when the start note operation guidance marker reaches the first size.

In addition, a plurality of intermediate determination points may be disposed on the path indicated line, and the determination unit may determine that the corresponding operation fails when the touch input does not pass through a predetermined number of the intermediate determination points during the movement of the touch input or when the movement of the touch input reverses an arrangement order of the intermediate determination points.

At this time, the predetermined time may be a time period from the timing when the start note operation guidance marker reaches the first size to timing when the cadence note operation guidance marker reaches the second size.

In addition, the determination unit may determine that the corresponding operation is successful when the touch input is started at a position of the start note at the timing when the start note operation guidance marker reaches the first size and the touch input moves to a position of the cadence note along a position of the path indicated line for the predetermined time.

In addition, the voice controller may vary and output the effect sound source according to whether the corresponding operation is successful determined by the determination unit, and control the music sound source to be reproduced at a constant volume regardless of whether the corresponding operation is successful.

At this time, the effect sound source may include a tapping sound with respect to the operation guidance note and a vocal sound source constituting the music, and the voice controller may control a part of the effect sound source to be muted or controls a volume of the part of the effect sound source to be reduced when the operation on the operation guidance note fails.

In accordance with an aspect of the present disclosure, there is provided a computer-readable recording medium, as a recording medium recording a program for executing a game method associated with music, which records a program for implementing: a game screen providing function of providing an operation guidance note including a start note, a cadence note, and a path indicated line connecting the start note and the cadence note on a game screen; an input function of receiving an operation of a user associated with the operation guidance note; a determination function of determining whether the operation of the user starts at the start note and ends at the cadence note within a predetermined time to determine whether an operation on a corresponding operation guidance marker is successful; and a voice control function of reproducing sound source data including an effect sound source according to whether an operation on the operation guidance note is successful and a music sound source constituting music according to progress of a game.

Advantageous Effects

A music game apparatus and a recording medium therefor according to the present disclosure have an effect of allowing a user to enjoy a music game more vividly and rhythmically.

More specifically, a music game apparatus and a recording medium therefor according to the present disclosure may provide an operation guidance note composed of a start note, a cadence note, and a path indicated line connecting the start note and the cadence note and may determine the success or failure of the operation of the corresponding note only by a time interval and a direction for moving the operation along the path indicated line, so that it is possible to play the corresponding game according to the tempo of music to improve the interest in the game.

MODE FOR CARRYING OUT THE INVENTION

Hereinafter, a game apparatus and a recording medium therefor according to the present disclosure will be described in detail.

Figure 1:
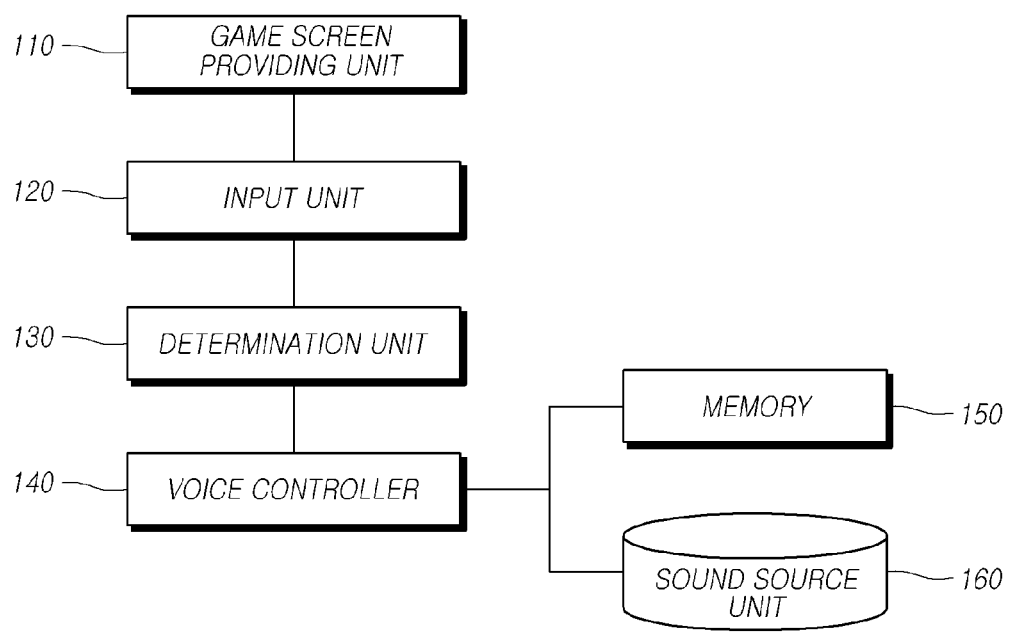
FIG. 1 is a functional block diagram illustrating a game apparatus capable of executing a game method according to an embodiment of the present disclosure.

Referring to FIG. 1, a game apparatus according to an embodiment of the present disclosure may include a game screen providing unit 110, an input unit 120, a determination unit 130, and a voice controller 140, and may further include a memory unit 150, a sound source unit 160, and the like.

The memory unit 150 stores various kinds of code data necessary for executing a music game, and stores sound source data including a music sound source and an effect sound source necessary for a music output. In addition, the memory 150 stores tapping event data corresponding to a key input (touch operation) to be input by a gamer in accordance with the progress of a music game, game result data generated while a user executes the music game, and the like. The memory unit 150 stores data processed by the determination unit 130 in the form of cache data, and has a function of extracting and transmitting data requested by the determination unit 130 and the voice controller 140.

The game screen providing unit 110 outputs image data or the like associated with the corresponding game on a game screen. The image data refers to various kinds of image-related data utilized in music games such as character, note type, effecter, illustration, progress, interface structure, and the like.

In particular, the game screen providing unit 110 displays a note which is an operation guidance marker for guiding the position and timing of a key input (touch operation) in accordance with the progress of the game.

In this specification, in order to guide the position and timing of the game operation in conjunction with output music, any type of image or marker displayed on the game screen may be referred to as a "note", but is not limited thereto, and may be referred to as another term or expression.

In particular, in the present disclosure, a special type of note composed of a start note, a cadence note, and a path indicated line connecting the start note and the cadence note is used, and for convenience, such a note is expressed as an operation guidance note or a path note.

The configuration and operation method of such a path note will be described in more detail below with reference to FIGS. 2 and 3.

The game screen providing unit 110 is a concept including a hardware display device such as a liquid crystal display (LCD), an organic light emitting display (OLED) or the like having a touch screen function and a controller for controlling the display thereof. The game screen providing unit 110 may be expressed as other terms such as a display unit.

The input unit 120 may be a key input device including a plurality of operation keys and the like included in the game apparatus, but the present disclosure is not limited thereto. The input unit 120 may be a touch input means capable of inputting a touch signal to the game screen providing unit 110 in which the game screen is displayed.

That is, the input unit 120 according to the present embodiment may be a touch screen, and may input a touch signal associated with the note through the touch screen according to the progress of the game.

For example, the touch signal acting as a game operation signal may be input using the input unit 120 which is the touch screen in a state in which the above-described path note is displayed on the game screen providing unit 110.

The input unit 120 receives a key input or a touch input from a user, converts the received input into a corresponding input code, and transmits the converted input code to the determination unit 130.

The determination unit 130 determines whether a user's operation is successful based on the operation signal of the user which is input to the input unit and information on the operation guidance note provided to the game screen by the game screen providing unit.

More specifically, the operation guidance note according to the present embodiment is provided in the form of the path note composed of the start note, the cadence note, and the path indicated line connecting the start note and the cadence note, and the determination unit 130 confirms whether the user's operation input to the input unit starts from the start note of the path note and ends at the cadence note within a predetermined time.

For example, in a case in which the input unit 120 is a touch input means that touch input is enabled, the determination unit 130 determines that the operation on the path note is successful when the touch input is started from the start note at first timing and moves to the cadence note along the path indicated line while the touch input state is held.

Hereinafter, the type and operation method of the path note acting as the operation guidance note according to the present disclosure will be described in more detail with reference to FIGS. 2 and 3A and 3B.

Figure 2:
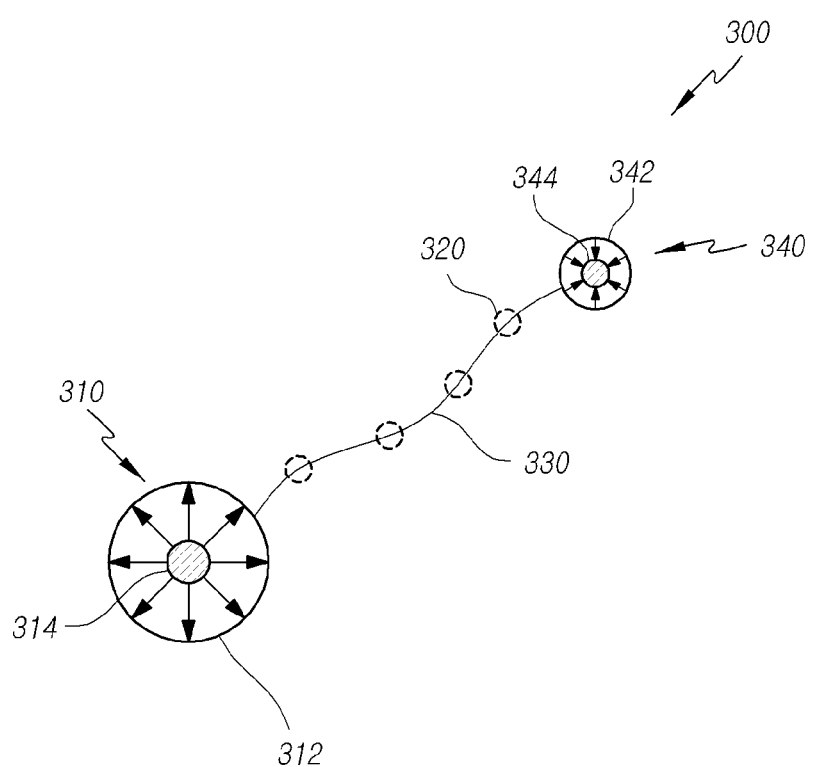
FIG. 2 is a schematic diagram illustrating the type of a path note, which is an operation guidance note used in an embodiment of the present disclosure, and a success determination method thereof.
Figure 3A:
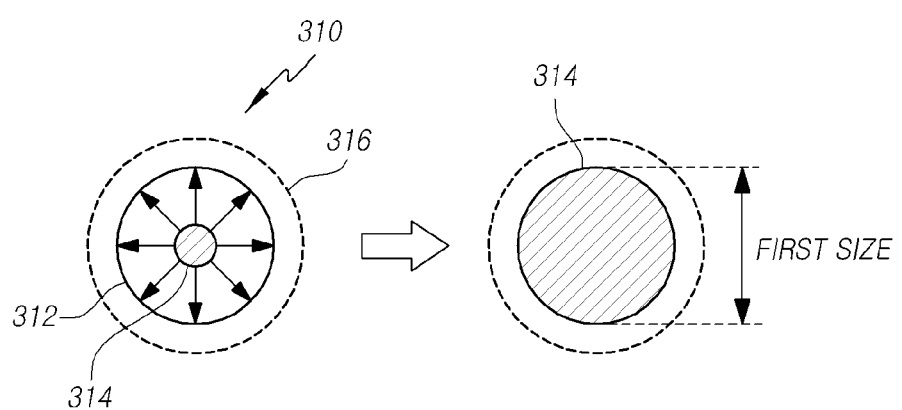
FIGS. 3A and 3B are schematic diagrams illustrating the operation method of a start note and a cadence note used in an embodiment of the present disclosure.
Figure 3B:
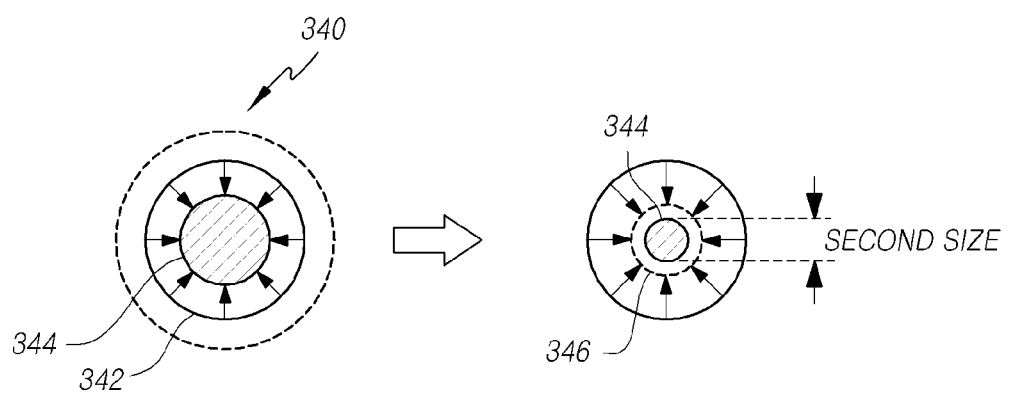
Figure 4:
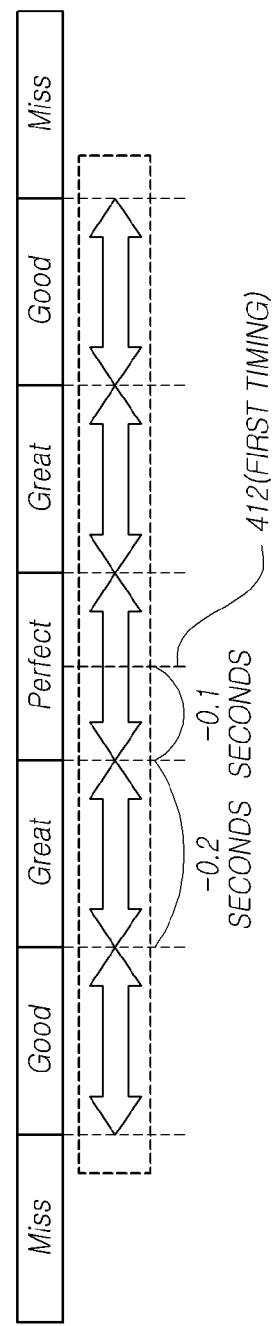
FIG. 4 is a schematic diagram illustrating a determination level criterion according to an embodiment of the present disclosure.

FIG. 2 is a schematic diagram illustrating the type of a path note, which is an operation guidance note used in an embodiment of the present disclosure, and a success determination method thereof, and FIGS. 3A and 3B are schematic diagrams illustrating the operation method of a start note and a cadence note used in an embodiment of the present disclosure.

As illustrated in FIG. 2, the operation guidance note or the path note used in the present disclosure may include a start note 310, a cadence note 340, and a path indicated line 330.

The start note 310 is a fixed indicator located at the forefront of the path of the path note 300, and is used to indicate an initial position and initial timing (first timing) at which a user has to perform a key input or a touch input.

The cadence note 340 is a fixed indicator located at the end of the path of the path note 300, and indicates the distal end of the key input for the path note.

The path indicated line 330 is an indicated line connecting the start note 310 and the cadence note 340, and may include a plurality of intermediate determination points 320 that are present at regular intervals. However, the intermediate determination points 320 may not be displayed on the game screen.

The start note 310 includes a predetermined circular or elliptic start note outer wall 312, and a start note operation guidance marker 314 as a key input guidance marker for the start note is displayed inside the start note outer wall.

The start note operation guidance marker 314 indicates initial timing of the touch operation or the key input with respect to the start note. The start note operation guidance marker 314 may be an image which is generated at the center of the start note outer wall 312 and is enlarged at a constant speed to the same shape and size as the start note outer wall or more.

At the time of operating the note as illustrated in FIG. 2, when the start note operation guidance marker 314 generated inside the start note outer wall 312 is enlarged to the size of the start note outer wall 312 or is enlarged from the start note outer wall to an input recognition range having a certain error range, the touch input (key input) operation should be performed at the position of the corresponding start note 310.

At this time, the size of the start note operation guidance marker 314 at initial timing of a touch on the start note is defined as a first size.

That is, the first size of the start note operation guidance marker 314 may be equal to the size of the start note outer wall 312, or the size of the input recognition range having a certain error range from the start note outer wall.

In this state, the touch input has to move to the cadence note 340 along the path indicated line 330 while the touch input state is held.

That is, the start note 310 indicates touch initial timing and a touch initial position, and the path indicated line 330 is a key input guidance marker that guides an operation of moving or dragging a touch input in a touch holding state.

At this time, the cadence note 340 functions to guide touch holding timing or touch dragging timing along the path indicated line 330.

More specifically, the cadence note 340 also includes a constant circular or elliptical cadence note outer wall 342, and a cadence note operation guidance marker 344 acting as a key input guidance marker is displayed inside the cadence note.

The cadence note operation guidance marker 344 is a key input guidance marker for guiding a touch holding period or touch termination timing to move to the cadence note along the path indicated line 330.

Such a cadence note operation guidance marker 344 may be an image that is generated inside the cadence note outer wall 342 at initial timing of a touch on the start note, that is, at the timing at which the start note operation guidance marker 314 reaches a first size and that varies in size to a second size.

As an example, the cadence note operation guidance marker 344 may be an image that is generated to have the size of the cadence note outer wall 342 and then decreases in size at a constant speed and disappears, and in this case, the second size may be 0.

In this manner, only when a touch drag input (movement) is performed along the path indicated line 330 until the cadence note operation guidance marker 344 reaches the second size and a touch input is finally continued up to the position of the cadence note 340, it is determined that a final operation on the corresponding note has been successful.

Referring again to the operation on the path note in FIG. 2, a user touches (key input) the position of the start note 310 in a state where the start note operation guidance marker 314 is within the input recognition range interlocked with the start note outer wall, and drags the touch to the position of the cadence note 340 while holding the touch input along the path indicated line 330 during a predetermined time, that is, during which the cadence note operation guidance marker 344 generated at the time of the touch on the position of the start note 310 becomes the second size.

In other words, the predetermined time, which is a reference time for determining the success or failure of the operation on the path indicated line 330 of the path note is a period from timing when the start note operation guidance marker 314 reaches the first size to timing when the cadence note operation guidance marker 344 reaches the second size.

That is, the determination unit 130 of the game apparatus according to the present disclosure determines whether a specific path note satisfies a first condition in which a touch input is present at the position of the start note 310 at first timing when the start note operation guidance marker 312 reaches the first size, and a second condition in which a touch operation is dragged along the path indicated line in a state in which the touch input is held within a predetermined time, which is the time until second timing when the cadence note operation guidance marker 314 generated at the first timing reaches the second size.

The determination unit 130 determines that the operation on the corresponding path note has been successful only when the specific path note satisfies the both the first condition and the second condition.

At this time, the plurality of intermediate determination points 320 that are not displayed on the path indicated line 330 may be disposed for accurate determination of the second condition, and the determination unit 130 may determine that the corresponding operation has failed when the touch input does not pass through a predetermined number or more of intermediate determination points during the movement (i.e., dragging) of the touch input or when the movement of the touch input reverses the arrangement order of the intermediate determination points.

In addition, in order to determine the success of failure with respect to the second condition, that is, the operation on the path indicated line 320, the determination unit 130 may determine that the corresponding input has failed when the key input (touch input) of the user fails consecutively more than a predetermined number of the intermediate determination points 320.

For example, in a case in which the number of success determination criteria of the intermediate determination points 320 is set as three, when a user fails to input four or more intermediate determination points 320 continuously, it is determined that the second condition, which is the operation criterion for the path indicated line 330, is not satisfied.

When a user fails to perform a key input for the intermediate determination points 320 three consecutive times while the key input passes through the path indicated line 330, and then successfully inputs the next intermediate determination points, it may be determined that the corresponding operation is a success operation that satisfies the second condition even if the key input cannot pass through two or less intermediate determination points thereafter.

Accordingly, the degree of difficulty of the game can be adjusted by adjusting the number of success determination criteria of the intermediate determination points 320.

As a result of playing the game by adjusting the numerical values a number of times, it is preferable to set the number of success determination criteria to 3 for the appropriate degree of difficulty. However, this may vary depending on the tempo of music selected by a user, and cannot be uniformly determined since it is a numerical value that needs to be adjusted according to the situation by adjusting the degree of difficulty.

In the above description, the success or failure of the user's key input to the intermediate determination points 320 of the user is 'continuously' determined, but alternatively, or additionally, the success or failure of the user's key input may be set based on the number of simple inputs. For example, in a case in which the number of success determination criteria of the intermediate determination points 320 is set to 10 (regardless of successive failures), when the user fails to input 11 or more intermediate determination points 320, it may be determined that the input to the path indicated line 330 is a failure.

In addition, the determination unit 130 may determine that the corresponding operation has failed when the movement of the touch input reverses the arrangement order of the intermediate determination points 320, in a further consideration of the order of the intermediate determination points 320 for the operation determination with respect to the path indicated line 330.

For example, when a predetermined order is assigned to the intermediate determination points 320 disposed on the path indicated line and the touch drag input passes through the intermediate determination points, out of the assigned order in a touch operation process along the path indicated line, it may be determined that the second condition is not satisfied.

In this manner, using the path note and the operation method as illustrated in FIG. 2, the touch drag input along the path indicated line 330 from the start note 310 to the cadence note 340 may be performed only until the cadence note operation guidance marker 344 disappears. To this end, the determination unit 130 only determines whether the touch drag input has passed through the intermediate determination points 320, and does not recognize passage timing of each intermediate determination point 320.

That is, in the method of FIG. 2, only whether the touch drag input has passed through the path indicated line 330 within a predetermined period (a period from the initial timing of the touch until the cadence note operation guidance marker becomes the second size) is determined, and the movement speed of the touch drag input is not determined.

The determination unit 130 determines whether the touch drag input follows the positions and directions (order) of the plurality of intermediate determination points 320 disposed in the path indicated line 330 to determine that the corresponding operation is successful, and does not consider the movement speed between the intermediate determination points 320.

Thus, a gamer who is skilled in the operation may receive recognition of the success of the operation on the corresponding note by completing the touch drag input along the path indicated line before the cadence note operation guidance marker 344 disappears, and may be able to earn time for the operation of the next note.

In addition, in the method as illustrated in FIG. 2, after the key input (touch operation) to the path note composed of the start note 310, the path indicated line 330, and the cadence note 340 is completed and whether the operation of the note is successful is determined, the corresponding note may be controlled to disappear from the display unit.

In the above-described path note configuration and operation success determination method, a user can freely drag the path indicated line connecting the start note and the cadence note at a desired speed, rather than dragging the same at a constant speed.

That is, there is an advantage that the user can perform the corresponding operation on the path indicated line 330 at a freely selected speed.

In particular, a mobile device-based music game have a fundamental difficulty in introducing complicated and various types of path notes due to the limitation of a mobile screen size.

This problem is becoming more problematic due to a touch method, which is a mobile device-based input method.

A user touches the limited mobile screen to input a key thereon, but this operation itself hides the game screen so that it cannot smoothly perform a music game.

This difficulty is further increased when a complicated note method is adhered to, and the user has to drag the path indicated line at a constant speed for a successful key input, which means that the shape and direction of the path indicated line must be continuously checked.

Therefore, the touch operation movement path of the existing path note cannot have a complicated form.

However, since the path note 300 of the present disclosure allows the user to operate the path indicated line 330 at a freely selected speed, restrictions on the form of the path indicated line are relaxed. Accordingly, there is an advantage that the path indicated line 330 can be expressed in various shapes including straight lines, curved lines, and a combination of the straight line and the curved line.

In addition, in the embodiments of the FIGS. 2 and 3, an example in which the start note operation guidance marker 314 and the cadence note operation guidance marker 344 are generated inside the start note outer wall and enlarged to the first size or reduced to the second size has been described. However, the present disclosure is not limited thereto.

For example, the cadence note operation guidance marker 344 may be expressed in such a manner that the clock hands move clockwise inside the cadence note outer wall 342 or the size varies clockwise.

In this manner, since the cadence note operation guidance marker 344 is for guiding a predetermined time which is the time limit from the start note to the cadence note 340 while a user's input passes through the path indicated line 330, it is not necessary to be limited to such a form.

In addition, although the start note 310 and the cadence note 340 representatively have a circular shape, they are not limited thereto.

In addition, as illustrated in FIG. 3A, the start note 310 may further include a start note input recognition range 316 extending to a certain extent outside the start note outer wall 312.

That is, until the first timing when the start note operation guidance marker 314 is generated and then gradually enlarged to reach the first size corresponding to the start note outer wall 312, the key input (touch input) should be started with respect to the start note 310.

When the start note operation guidance marker 314 presents a time reference (first timing) to be input by the user in this manner, the start note input recognition range 316 presents a spatial reference to be input by the user.

The determination unit 130 determines that the above-described first condition is satisfied when the user inputs (touches) the corresponding key within the start note input recognition range 316 at the first timing.

Accordingly, when the start note input recognition range 316 is widened, the degree of difficulty of the game is decreased, and when the start note input recognition range 316 is narrowed, the degree of difficulty of the game is increased, so that the start note input recognition range 316 can be used to adjust the degree of difficulty of the game.

Likewise, as illustrated in FIG. 3B, the cadence note 340 may further include a cadence note input recognition range 346.

In addition, the determination unit 130 may also allow the user to discretely determine the level of the operation result.

For example, timing when the start note operation guidance marker 314 is enlarged to reach the first size is set as first timing 410, and determination level values of various stages can be classified depending on how early or late a user's key input is input based on the first timing 410.

The determination level values are set by temporally classifying a difference between timing when the user actually inputs the corresponding key and the first timing 410. For example, when the user inputs the key at about 0.1 second based on the first timing 410, a "perfect" determination may be received, and when the user inputs the key at about 0.12 seconds, a "great" determination may be received.

In an embodiment of the present disclosure, the determination level values are classified into four levels of "perfect", "great", "good", and "miss", but the number and expression of the levels are not necessarily limited thereto. Likewise, the determination level values are not limited to these, and may vary depending on the speed and difficulty of the music.

The voice controller 140 of the game apparatus according to the present disclosure functions to output a music sound source and an effect sound source according to the determination result of the determination unit 130, that is, whether the operation on the path note is successful.

That is, the voice controller 140 reproduces sound source data including the effect sound source according to the success or failure of the operation on the path note and the music sound source constituting the music in accordance with the progress of the game.

In the present disclosure, in order to increase the interest in a game and prevent a sound delay phenomenon, sound source data output from a music game is divided into a music sound source (sound source track) and an effect sound source (sound effect track). The voice controller 140 may vary and output the effect sound source according to the success or failure of the operation on the path note while outputting the music sound source at a constant volume regardless of the success or failure of the operation on the path note.

At this time, when the operation on the path note is successful, the effect sound source may be normally output at a constant volume. When the operation on the path note fails, the effect sound source may be muted or the volume of the effect sound source may be reduced and output.

To this end, the sound source data stored in the sound source unit 160 according to the present disclosure includes a first sound source that is continuously output regardless of the success or failure of the user's operation and a second sound source of which output state varies (muting or volume control) according to the success or failure of the user's operation. For the sake of convenience, the first sound source is expressed as a music sound source and the second sound source is expressed as an effect sound source in the present specification, respectively.

That is, the sound source data output according to the progress of the game may be composed of two separate tracks or files. The music sound source which is not changed according to the execution of the game is classified into the sound source track, and the effect sound source which varies according to the execution of the game is classified into the sound effect track.

These two tracks, that is, the sound source track and the sound effect track are interlocked with each other. As described below, the sound effect track is composed of a plurality of divided parts interlocked with each note.

In this case, the effect sound source included in the sound effect track includes a tapping sound or a success/failure sound effect generated according to a key input or a touch operation of the user, and also includes a sound source of a vocal part of music or a sound source of a major musical instrument part.

In addition, the music sound source included in the sound source track may include a background sound source and sound sources of the remaining musical instrument parts other than those used as the effect sound source, among the sound sources that make up one piece of music.

For example, only the sound sources of the vocal part and the other musical instruments are separated from the entire sound source of a song "A", the tapping sound or the success/failure sound effect is added thereto to constitute the effect sound track, and the remaining parts of the song "A" can be constituted as the sound source track as the music sound source.

Therefore, as described below, the music sound sources are continuously output regardless of the success or failure of the operation during the music game, and the effect sound source can be muted according to the success or failure of the operation.

Of course, in another embodiment, when the key input fails (that is, the operation fails), the volume of the effect sound source may be controlled to be reduced to a certain degree without muting the effect sound source.

In addition, it is possible to control the volume of the effect sound source to be reduced according to the successive number of key input failures or the degree of success of the operation on the path note of the present disclosure.

For example, when a first key input fails, the corresponding volume is reduced to 80% of the volume of the original effect sound source, 60% for two successive failures, and 40% for three successive failures.

Of course, in this case, when the key input is successful after the volume reduction control of the effect sound source according to the key input failure, the volume of the effect sound source can be gradually increased.

In this manner, when at least one of the key input position and timing with respect to the path note does not match a predetermined success determination condition, the voice controller 140 according to the present disclosure may recognizes that the operation on the path note has failed, and may perform control to mute the effect sound source or reduce the volume of the effect sound source.

For example, when it is determined that the corresponding operation has failed in a process of the start of touch on the start note and the touch movement (dragging) operation along the path indicated line which are a series of operations on the path note, the effect sound source may be muted or the volume of the effect sound source may be reduced to a certain degree until the corresponding path note disappears.

Instead, when the key input position and timing with respect to each path note meet the predetermined success determination condition, the voice controller 140 displays the key input success on the display unit and controls the effect sound source to be reproduced and output normally.

In addition, in the case where the path note according to the present embodiment is used, when the operation on the first start note fails, the volume of the effect sound source is reduced to a certain degree, and when the operation on the subsequent path indicated line consecutively fails, the volume of the effect sound source may be further reduced.

Of course, at this time, the voice controller 140 controls the music sound source to be continuously reproduced and output regardless of the success or failure of the operation on the path note.

In addition, the game apparatus may separately display the success or failure of the operation on the path note on the display unit.

Using the above-described method, the user fails to listen to the effect sound source (tapping sound) or listens to the same at a small volume to recognize the operation failure when the key input (operation) on the path note fails, so that the user cannot listen to normal music performance along with an increase in the number of the operation failures.

When the user fails to input the previous note, the volume of the effect sound source may be muted or the effect sound source may be output at a small volume. However, when the user succeeds in inputting the next note, the game apparatus normally reproduces the effect sound source at a constant volume.

Accordingly, the user can normally listen to the sound effect (tapping sound) when the key input is successful after the failure of the key input.

Using this approach, only the effect sound source may be controlled to vary according to the success or failure of the operation on the path note, and the music sound source may be continuously output regardless of the success or failure of the operation on the note, so that the interest in the game can be maintained at a certain level or more even if a time delay occurs in the output of the effect sound source according to the key input operation.

In particular, when the vocal part of the music is included in the effect sound source, the key input operation of a gamer can correspond to the fact that the gamer actually sings, so that the interest in the game can be doubled.

Figure 5:
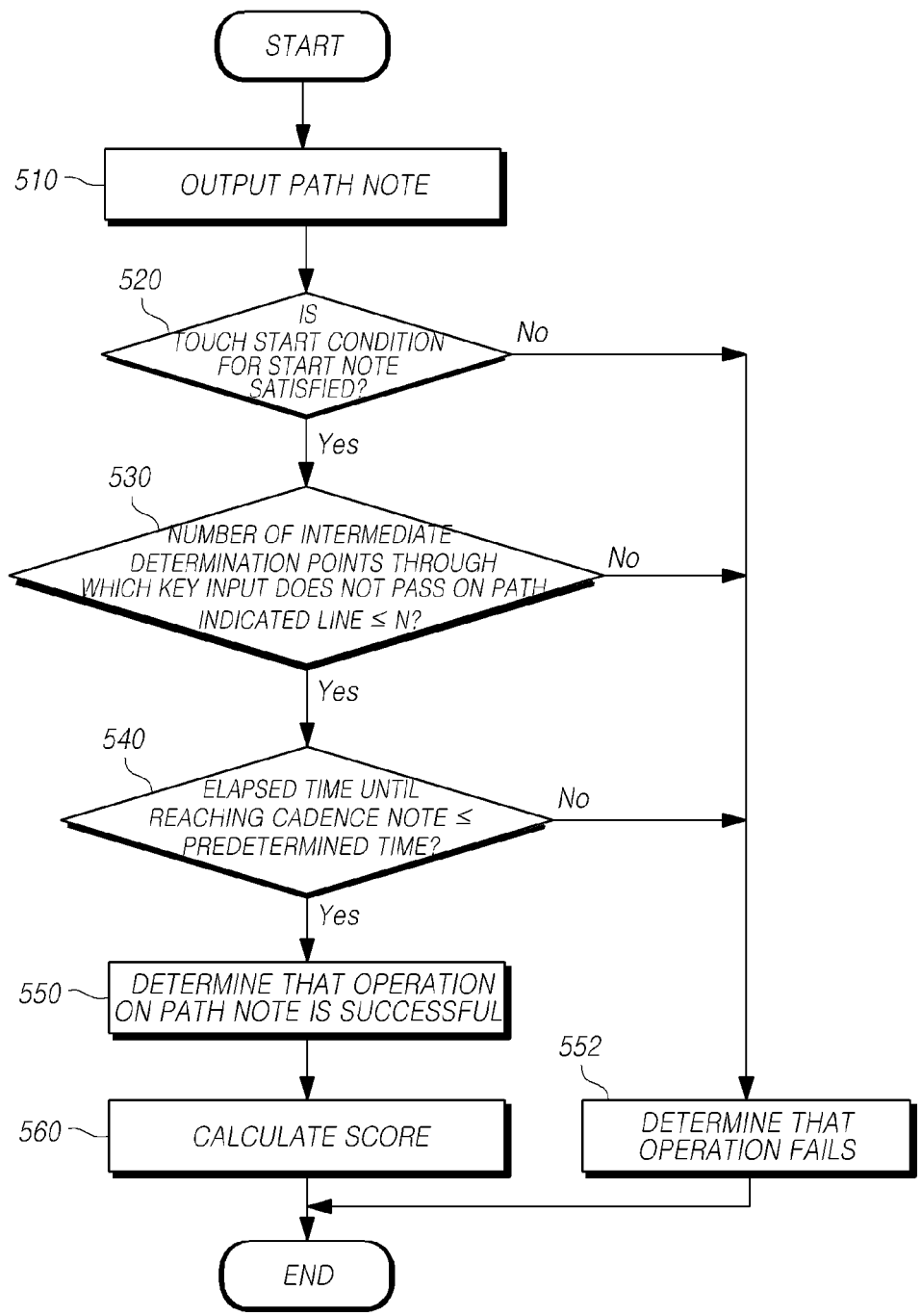
FIG. 5 is a diagram illustrating a game method according to an embodiment of the present disclosure.

Referring to FIG. 5, in a game method according to an embodiment of the present disclosure, in operation 510, the game screen providing unit 110 displays the image of the path note 300 on a game screen when a music playing game is executed.

In operation 520, the game apparatus determines whether a user starts to perform a key input (touch input) within the start note input recognition range 316 during a time period until first timing when the start note operation guidance marker 314 constituting the path note reaches a first size which is a reference size after the start note operation guidance marker 314 is generated.

In operation 530, the game apparatus determines the success or failure of the operation on the path indicated line 330 of the path note. For example, when the user's key input does not continuously pass through a predetermined number or more of intermediate determination points 320 or when there is an error in the passage order of the intermediate determination points, it is determined that the operation on the path indicated line of the corresponding path note has failed.

In addition, in operation 540, whether the user's key input (touch dragging) reaches the cadence note until second timing that is timing when the cadence note operation guidance marker 344 is reduced to a second size after the cadence note operation guidance marker 344 is generated in the cadence note outer wall 342.

Only when the user's key inputs in operations 520, 530, and 540 are all successful, that is, when the start of touch on the start note and the touch dragging operation up to the cadence note are all successfully performed, the game apparatus determines that the user's key input to the path note 300 is successful (operation 550), and otherwise, determines that the operation on the corresponding path note fails (operation 552).

Next, the game apparatus converts the key input operation result of the note executed by the user into a score after the user's key inputs to a plurality of path notes are all executed and the game ends, and determines whether a score satisfying a game clear condition is obtained based on the converted score. When the game clear condition is satisfied, the corresponding game is cleared according to the obtained score of the user.

Although the present disclosure has been described above with reference to the game apparatus and the game method, the present disclosure may further include a recording medium on which a program for executing such a game method is recorded.

That is, according to another embodiment of the present disclosure, as the recording medium recording the program for executing the game method associated with music, a computer-readable recording medium may be provided, which records a program implementing a game screen providing function of providing an operation guidance note including a start note, a cadence note, and a path indicated line connecting the start note and the cadence note on a game screen, an input function of receiving a user's operation associated with the operation guidance note, a determination function of determining the success or failure of the operation of a corresponding operation guidance marker by determining whether the user's operation starts at the start note and ends the cadence note within a predetermined time, and a voice control function of reproducing sound source data including an effect sound source according to the success or failure of the operation of the operation guidance note and a music sound source constituting the music in accordance with the progress of the game.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The invention claimed is:

1. A music game apparatus comprising:
a game screen providing unit configured to provide an operation guidance note including a start note, a cadence note, and a path indicated line connecting the start note and the cadence note on a game screen;
an input unit configured to receive an operation of a user associated with the operation guidance note;
a determination unit configured to determine whether the operation of the user starts at the start note and ends at the cadence note within a predetermined time to determine whether an operation on a corresponding operation guidance marker is successful; and
a voice controller configured to reproduce sound source data including an effect sound source according to whether an operation on the operation guidance note is successful and a music sound source constituting music according to progress of a game;
wherein the operation of the user input to the input unit is a touch input on the game screen; and
wherein a plurality of intermediate determination points is disposed on the path indicated line, and the determination unit determines that the corresponding operation fails when the touch input does not pass through a predetermined number of the intermediate determination points during movement of the touch input or when the movement of the touch input reverses an arrangement order of the intermediate determination points.

2. The music game apparatus as claimed in claim 1, wherein
the determination unit determines that the operation on the operation guidance marker is successful when the touch input is started at the start note and moves to the cadence note along the path indicated line in a state in which the touch input is held for the predetermined time.

3. The music game apparatus as claimed in claim 2, wherein the start note includes a start note outer wall and a start note operation guidance marker that is generated inside the start note outer wall and varies in size up to a first size, and the touch input is started by touching the start note when the start note operation guidance marker reaches the first size.

4. The music game apparatus as claimed in claim 3, wherein the cadence note includes a cadence note outer wall and a cadence note operation guidance marker that is generated inside the cadence note outer wall and varies in size up to a second size, and the cadence note operation guidance marker is generated at timing when the start note operation guidance marker reaches the first size.

5. A music game apparatus comprising:
a game screen providing unit configured to provide an operation guidance note including a start note, a cadence note, and a path indicated line connecting the start note and the cadence note on a game screen;
an input unit configured to receive an operation of a user associated with the operation guidance note;
a determination unit configured to determine whether the operation of the user starts at the start note and ends at the cadence note within a predetermined time to determine whether an operation on a corresponding operation guidance marker is successful; and
a voice controller configured to reproduce sound source data including an effect sound source according to whether an operation on the operation guidance note is successful and a music sound source constituting music according to progress of a game;
wherein:
the operation of the user input to the input unit is a touch input on the game screen;
the determination unit determines that the operation on the operation guidance marker is successful when the touch input is started at the start note and moves to the cadence note along the path indicated line in a state in which the touch input is held for the predetermined time;
the start note includes a start note outer wall and a start note operation guidance marker that is generated inside the start note outer wall and varies in size up to a first size, and the touch input is started by touching the start note when the start note operation guidance marker reaches the first size;
the cadence note includes a cadence note outer wall and a cadence note operation guidance marker that is generated inside the cadence note outer wall and varies in size up to a second size, and the cadence note operation guidance marker is generated at timing when the start note operation guidance marker reaches the first size: and
the predetermined time is a time period from the timing when the start note operation guidance marker reaches the first size to timing when the cadence note operation guidance marker reaches the second size.

6. The music game apparatus as claimed in claim 5, wherein the determination unit determines that the corresponding operation is successful when the touch input is started at a position of the start note at the timing when the start note operation guidance marker reaches the first size and the touch input moves to a position of the cadence note along a position of the path indicated line for the predetermined time.

7. The music game apparatus as claimed in claim 6, wherein a plurality of intermediate determination points is disposed on the path indicated line, and the determination unit determines that the corresponding operation fails when the touch input does not pass through a predetermined number of the intermediate determination points during the movement of the touch input or when the movement of the touch input reverses an arrangement order of the intermediate determination points.

8. The music game apparatus as claimed in claim 1, wherein the voice controller varies and outputs the effect sound source according to whether the corresponding operation is successful determined by the determination unit, and controls the music sound source to be reproduced at a constant volume regardless of whether the corresponding operation is successful.

9. The music game apparatus as claimed in claim 8, wherein the sound source data includes a music sound source track recording the music sound source that is reproduced at the constant volume regardless of a success result of the operation on the operation guidance note and an effect sound source track recording the effect sound source that varies and is output in conjunction with the success result of the operation on the operation guidance note.

10. The music game apparatus as claimed in claim 9, wherein the effect sound source includes a tapping sound with respect to the operation guidance note and a vocal sound source constituting the music.

11. The music game apparatus as claimed in claim 10, wherein the voice controller controls a part of the effect sound source to be muted or controls a volume of the part of the effect sound source to be reduced when the operation on the operation guidance note fails.

12. A non-transitory computer-readable recording medium, as a recording medium recording a program for executing a game method associated with music, which records a program for implementing:
a game screen providing function of providing an operation guidance note including a start note, a cadence note, and a path indicated line connecting the start note and the cadence note on a game screen;
an input function of receiving an operation of a user associated with the operation guidance note;
a determination function of determining whether the operation of the user starts at the start note and ends at the cadence note within a predetermined time to determine whether an operation on a corresponding operation guidance marker is successful; and
a voice control function of reproducing sound source data including an effect sound source according to whether an operation on the operation guidance note is successful and a music sound source constituting music according to progress of a game;
wherein the input operation of the user is a touch input on the game screen; and
wherein a plurality of intermediate determination points is disposed on the path indicated line, and the determination function determines that the corresponding operation fails when the touch input does not pass through a predetermined number of the intermediate determination points during the movement of the touch input or when the movement of the touch input reverses an arrangement order of the intermediate determination points.

13. The non-transitory computer-readable recording medium as claimed in claim 12, wherein
the determination function determines that the operation on the operation guidance marker is successful when the touch input is started at the start note and moves to the cadence note along the path indicated line in a state in which the touch input is held for the predetermined time.

14. The non-transitory computer-readable recording medium as claimed in claim 13, wherein the start note includes a start note outer wall and a start note operation guidance marker that is generated inside the start note outer wall and varies in size up to a first size, and the touch input is started by touching the start note when the start note operation guidance marker reaches the first size.

15. The non-transitory computer-readable recording medium as claimed in claim 14, wherein the cadence note includes a cadence note outer wall and a cadence note operation guidance marker that is generated inside the cadence note outer wall and varies in size up to a second size, and the cadence note operation guidance marker is generated at timing when the start note operation guidance marker reaches the first size.

16. A non-transitory computer-readable recording medium, as a recording medium recording a program for executing a game method associated with music, which records a program for implementing:
a game screen providing function of providing an operation guidance note including a start note, a cadence note, and a path indicated line connecting the start note and the cadence note on a game screen;
an input function of receiving an operation of a user associated with the operation guidance note;
a determination function of determining whether the operation of the user starts at the start note and ends at the cadence note within a predetermined time to determine whether an operation on a corresponding operation guidance marker is successful; and
a voice control function of reproducing sound source data including an effect sound source according to whether an operation on the operation guidance note is successful and a music sound source constituting music according to progress of a game;
wherein:
the input operation of the user is a touch input on the game screen;
the determination function determines that the operation on the operation guidance marker is successful when the touch input is started at the start note and moves to the cadence note along the path indicated line in a state in which the touch input is held for the predetermined time;
the start note includes a start note outer wall and a start note operation guidance marker that is generated inside the start note outer wall and varies in size up to a first size, and the touch input is started by touching the start note when the start note operation guidance marker reaches the first size;
the cadence note includes a cadence note outer wall and a cadence note operation guidance marker that is generated inside the cadence note outer wall and varies in size up to a second size, and the cadence note operation guidance marker is generated at timing when the start note operation guidance marker reaches the first size: and
the predetermined time is a time period from the timing when the start note operation guidance marker reaches the first size to timing when the cadence note operation guidance marker reaches the second size.

17. The non-transitory computer-readable recording medium as claimed in claim 12, wherein the voice control function varies and outputs the effect sound source according to whether the corresponding operation is successful determined by the determination function, and controls the music sound source to be reproduced at a constant volume regardless of whether the corresponding operation is successful.

18. The non-transitory computer-readable recording medium as claimed in claim 17, wherein the sound source data includes a music sound source track recording the music sound source that is reproduced at the constant volume regardless of a success result of the operation on the operation guidance note and an effect sound source track recording the effect sound source that varies and is output in conjunction with the success result of the operation on the operation guidance note.

19. The non-transitory computer-readable recording medium as claimed in claim 18, wherein the effect sound source includes a tapping sound with respect to the operation guidance note and a vocal sound source constituting the music.

20. The non-transitory computer-readable recording medium as claimed in claim 19, wherein the voice control function controls a part of the effect sound source to be muted or controls a volume of the part of the effect sound source to be reduced when the operation on the operation guidance note fails.

* * * * *